(No Model.)  7 Sheets—Sheet 1.
T. BRINING.
BOOT OR SHOE NAILING MACHINE.
No. 439,235.  Patented Oct. 28, 1890.
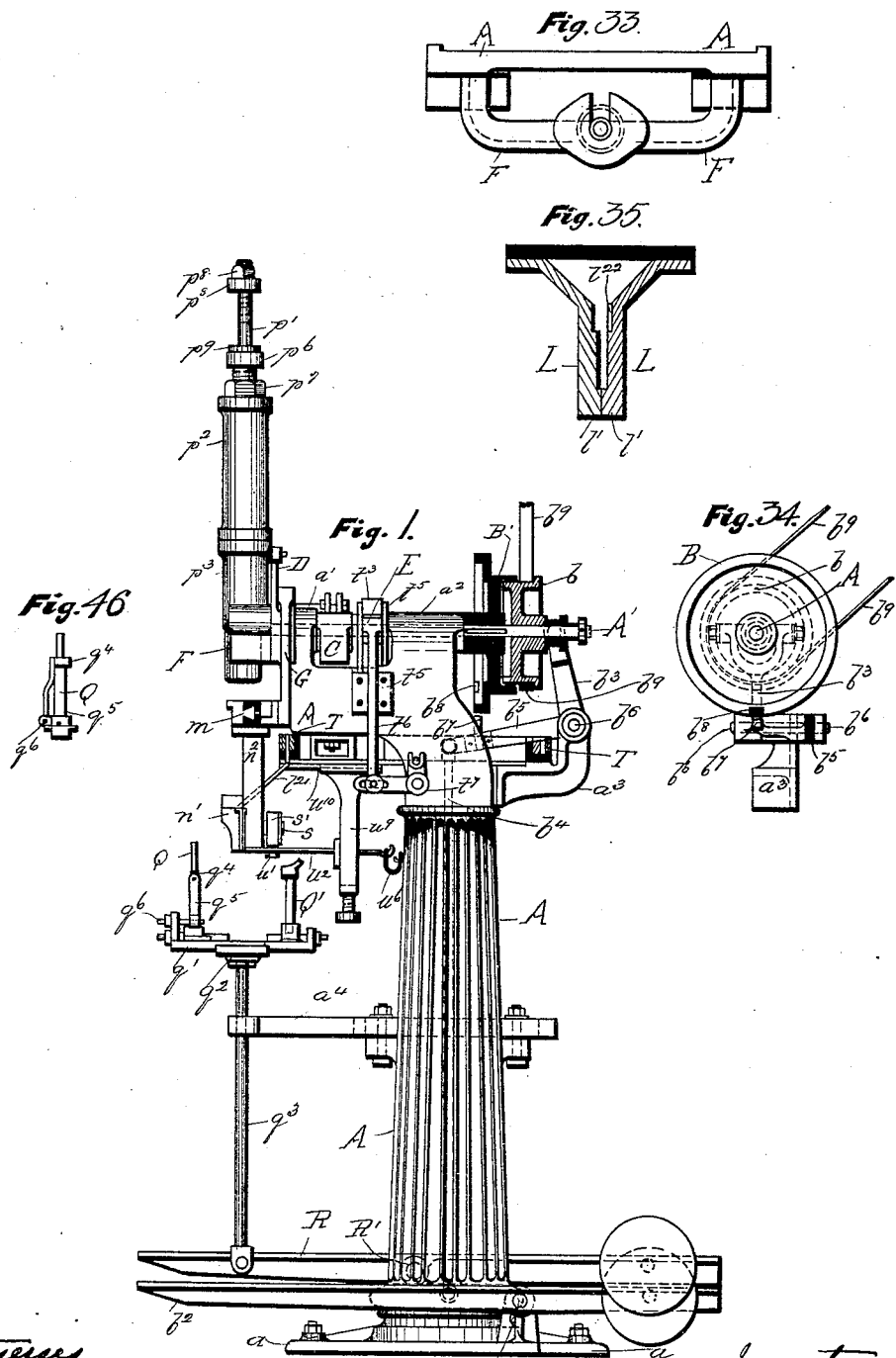

(No Model.) 7 Sheets—Sheet 2.

T. BRINING.
BOOT OR SHOE NAILING MACHINE.

No. 439,235. Patented Oct. 28, 1890.

Witnesses.
N. H. Smith.
Battus DeLong.

Inventor.
Thomas Brining.
By his attys.
Baldwin Davidson & Wright.

THE NORRIS PETERS CO., PHOTO-LITHO., WASHINGTON, D. C.

(No Model.)  7 Sheets—Sheet 3.
T. BRINING.
BOOT OR SHOE NAILING MACHINE.
No. 439,235. Patented Oct. 28, 1890.
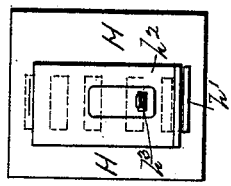
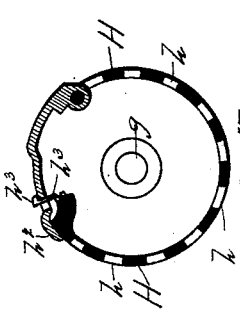
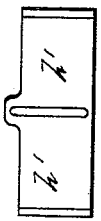
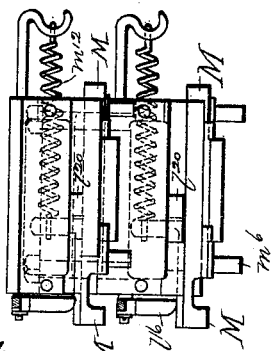
Witnesses
N. H. Smith
Balter DeLong
Inventor
Thomas Brining
By his Attys
Baldwin Davidson & Wright

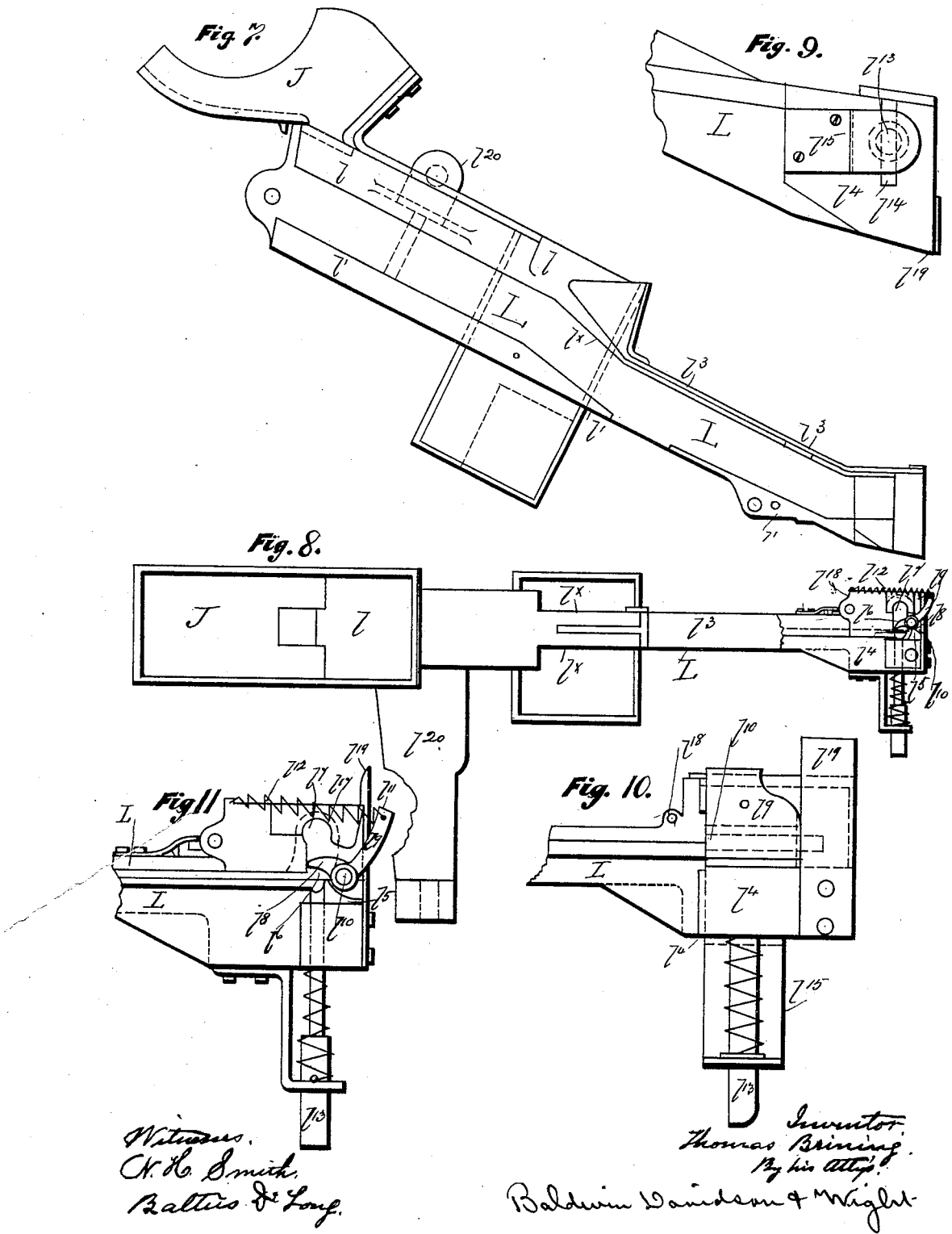

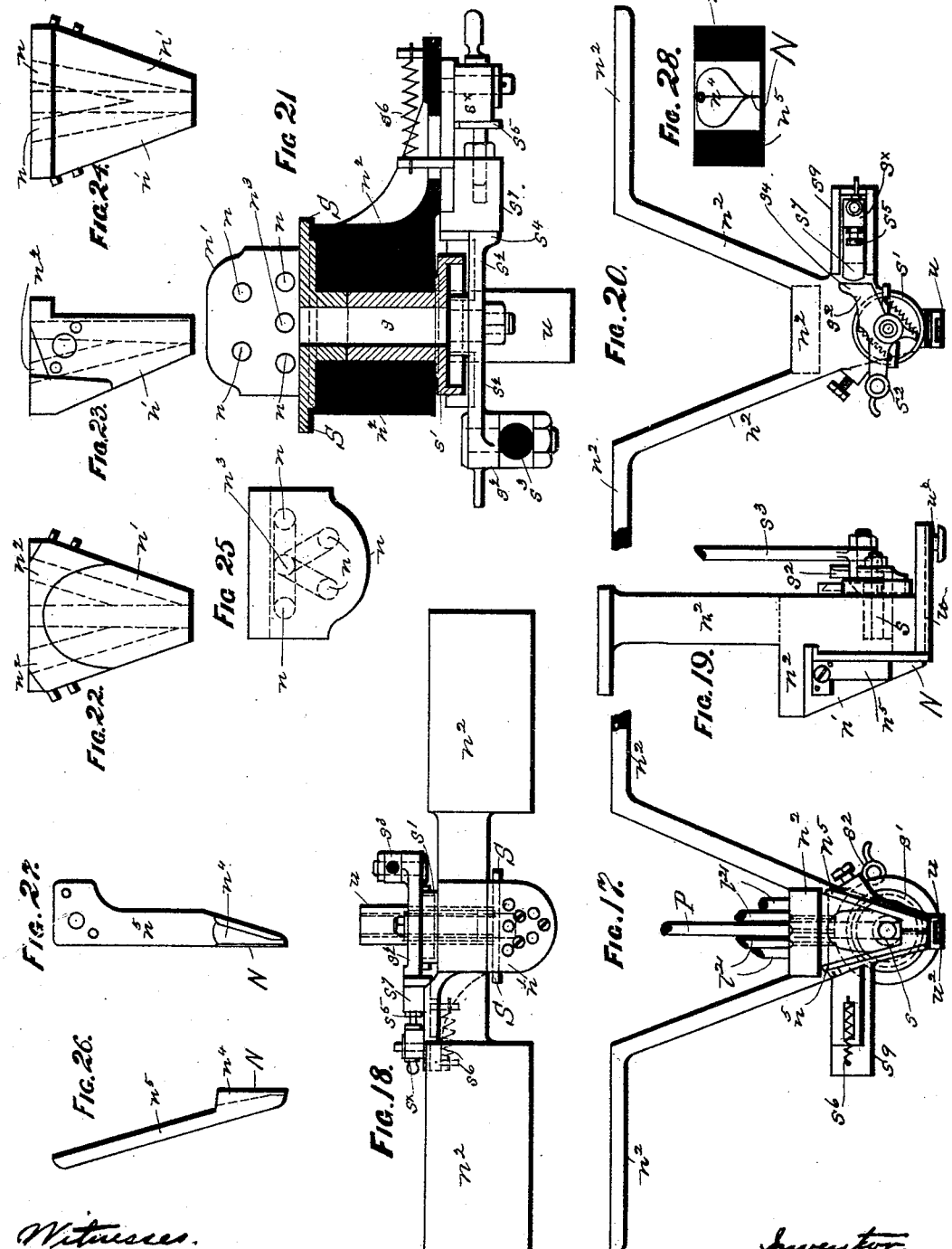

(No Model.) 7 Sheets—Sheet 6.
T. BRINING.
BOOT OR SHOE NAILING MACHINE.
No. 439,235. Patented Oct. 28, 1890.
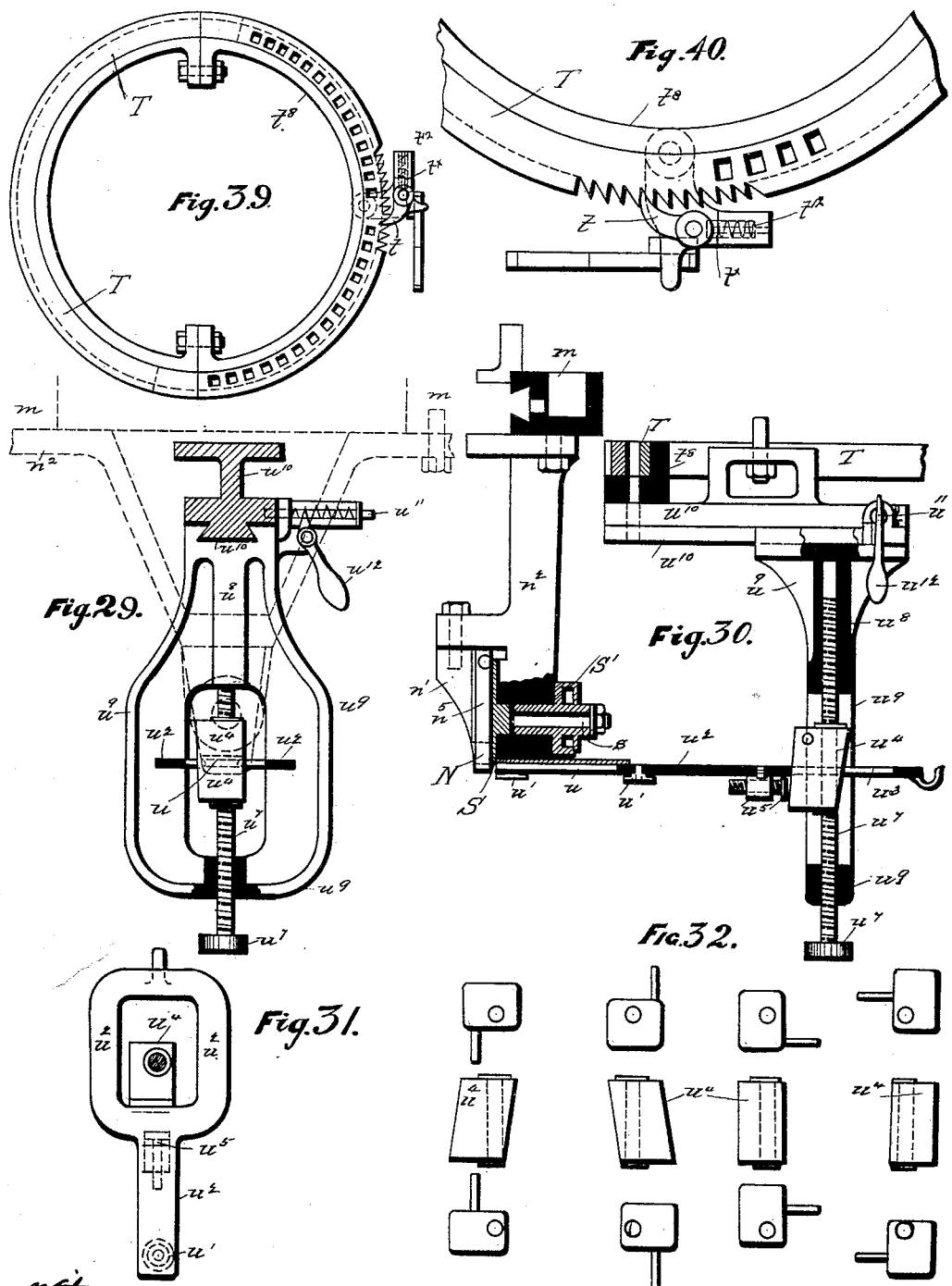
Witnesses.
N. H. Smith.
Battus DeLong.
Inventor.
Thomas Brining.
By his attys.
Baldwin Davidson & Wight.

(No Model.) 7 Sheets—Sheet 7.
T. BRINING.
BOOT OR SHOE NAILING MACHINE.
No. 439,235. Patented Oct. 28, 1890.
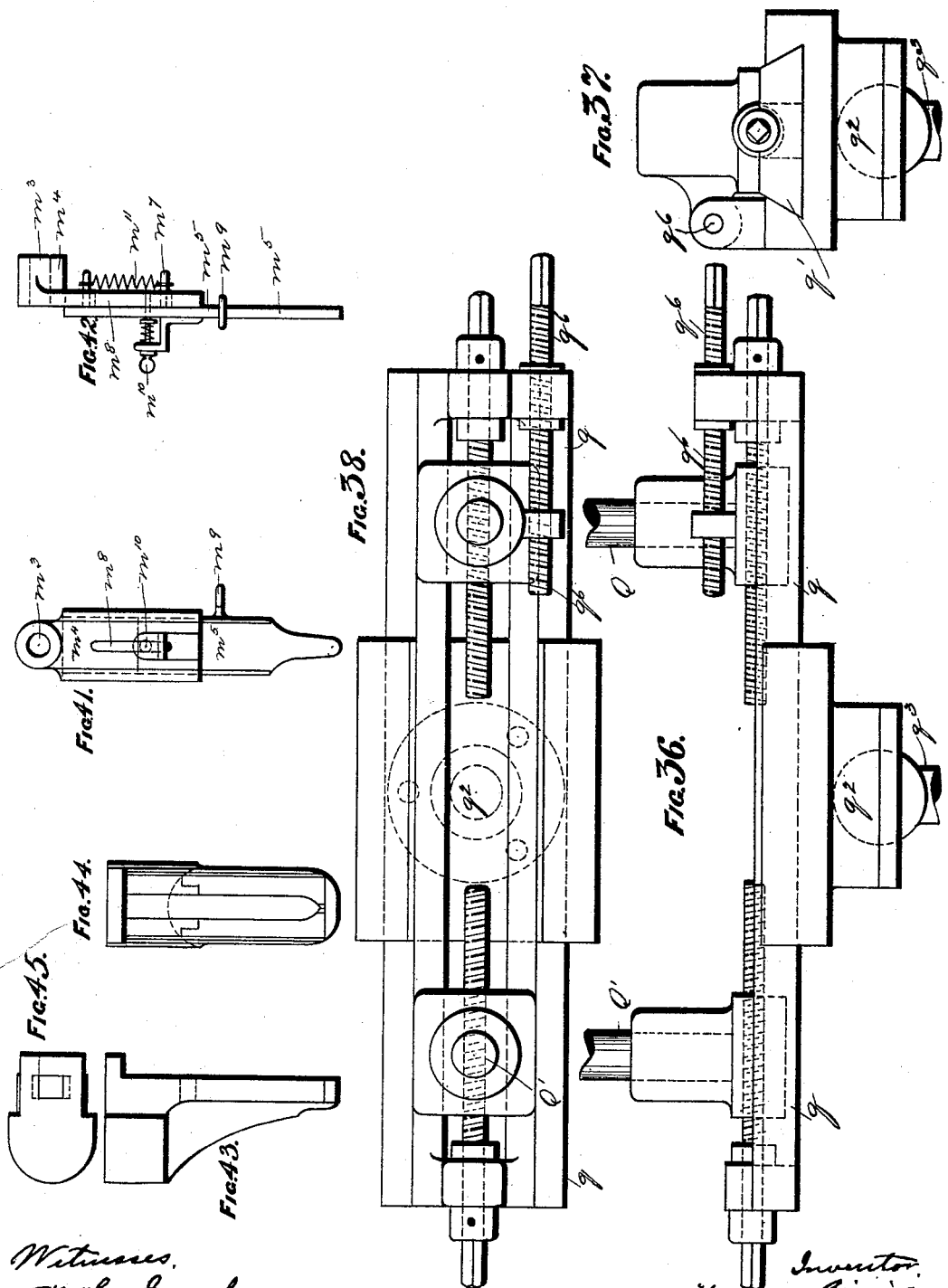

UNITED STATES PATENT OFFICE.

THOMAS BRINING, OF LEEDS, ENGLAND.

BOOT OR SHOE NAILING MACHINE.

SPECIFICATION forming part of Letters Patent No. 439,235, dated October 28, 1890.

Application filed April 16, 1890. Serial No. 348,217. (No model.) Patented in England March 23, 1889, No. 5,085.

*To all whom it may concern:*

Be it known that I, THOMAS BRINING, a subject of the Queen of Great Britain, residing at Leeds, in the county of York, England, have invented new and useful Improvements in Boot or Shoe Nailing Machines, (for which I have applied for British Letters Patent the 23d of March, 1889, No. 5,085,) of which the following is a specification.

The object of this invention is to provide improved apparatus for feeding and driving rivets, hob, nugget, and other nails into the sole, waist, and heel without removing the last when the lasting operation has been performed, thus preserving the boot or shoe in good form or draft.

In the herein-described apparatus the rivets or nails, hereinafter termed "nails," are placed in one or more cylindrical boxes and rings and are fed through chutes or tubes to driving mechanism, such as is described in Letters Patent of the United States granted the 20th day of August, A. D. 1889, No. 409,347.

Figure 3:
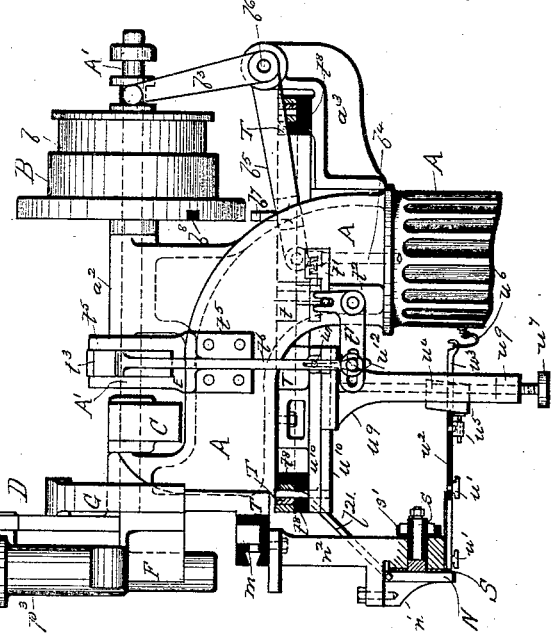
Figure 2:
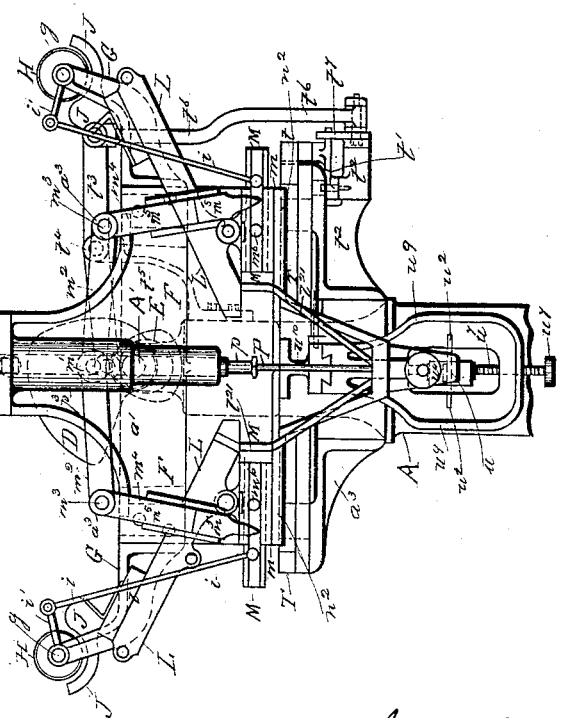

In the accompanying drawings, Figure 1 is a part side elevation of machine. Figs. 2 and 3 are respectively part front and side elevations of the head of the machine, showing position of parts when arranged with two sets of nail arranging and supplying mechanism; Figs. 4 and 5, enlarged side and end elevations of arrangement of mechanism for supplying the nails to the fixing mechanism; Fig. 6, a plan of block for carrying the supply-chute and slides. Figs. 7 and 8 are respectively a part sectional elevation and a plan of chute. Figs. 9, 10, and 11 are respectively enlarged part front elevation, end elevation, and a plan of end of chute. Figs. 12, 13, 14, and 15 are respectively an enlarged sectional elevation, an end elevation, a sectional plan, and a part plan looking at the top of mechanism for arranging and supplying the nails to the chutes; Fig. 16, a plan of gage for regulating the size of holes in the nail-box. Figs. 17 and 18 are respectively a front elevation and plan of die-box and mechanism for regulating the distance between the nails; Fig. 19, an end elevation of same; Figs. 20 and 21, a back elevation and an enlarged sectional plan of same; Figs. 22 to 28, details of some of the parts of same; Figs. 29 and 30, a front elevation and part sectional elevation of arrangement for regulating the distance of the nails from the edge of the sole; Fig. 31, a plan of one of the parts of the same. Fig. 32 is a view showing the various positions of distance-gage piece in elevations and top and bottom plans of same. Figs. 33 to 46 are details of various parts of the machine.

Like parts in all the views are marked with the same letters of reference.

The standard A, its base $a$, bearings $a'$ $a^2$, fixing or bracket $a^3$, and adjustable bracket $a^4$ constitute the frame-work of the machine.

In the bearings $a'$ $a^2$ rotates a shaft $A'$, on which is mounted the friction driving-pulley B and cams C, D, and E. To the front of the standard is fixed a fender or bracket F, to which the nail-setting mechanism is attached, while to each side of the standard may be fixed a bracket G G, each provided with one or more bearings for carrying the self-feeding mechanism, as hereinafter described.

In order to adapt the machine for nailing the soles (as well as attaching the soles to the "uppers" of boots or shoes with rivets) with nails of varying shapes and sizes, as well as to prevent the machine from standing while such nails are being changed or the box refilled, two or more sets of self-feeding mechanism, as hereinafter described, may be employed. At Fig. 2 a set is shown in outline on each side of the setting-tool; but at Fig. 4 an arrangement is shown whereby two or more sets may be fixed in step form above each other, each set being capable of being thrown in and out of action at pleasure, so that when one set is at work the remaining set or sets is or are stationary. With the exception of the sets being arranged, respectively, for the right and left hand sides of the machines, they may be duplicate of each other, and are marked with the same letters of reference.

To each bracket G may be fixed one or more pins or studs $g$, on which is or are mounted one or more nail-boxes H, which may be circular, as shown in the drawings hereunto annexed. In the periphery of the box H is cut or formed a number of slits or apertures $h$, which may vary in size or shape according to the character of the nail to be used, and in order to regulate the length of the holes to the varying lengths of nail an adjustable gage $h'$ may be mounted on the periphery and fixed in position by means of a set-screw. In the periphery is also provided a large opening, (covered by a hinged lid $h^2$ and retained in a closed position by a spring $h^3$,) through which the nails are passed to the box. A reciprocating or continuous rotary motion (the latter is preferred) is imparted from slide M through rod $i$ to arm or lever $i'$ and friction-clutch device, as shown. When it is preferred to impart a continuous rotary motion to the nail-box H, the friction device it is preferred to employ may be of a similar construction to that which has been used on sewing and printing machines—that is to say, a rim or flange $i^3$ is cast on one end of the box and projects therefrom in a line with the periphery. Within the rim or flange $i^3$ are placed the jaws $i^2$ $i^2$, one end of which is made to impinge against the rim while the opposite end of each jaw is inserted in a recess formed in the boss of the lever $i'$. By arranging the jaws at a slight angle to the center of the boss and box H and keeping them up to their work by means of the springs $i^4$, connected to the projections $i^5$, they are free to move without operating the box when the lever is raised in the direction of arrow; but when it is drawn downward the box is partially rotated by the boss of the lever $i'$ forcing the outer ends of each jaw tightly against the rim $i^3$, thus carrying the box round with them.

Below the box H is an intermediate hopper J, fixed to and communicating with a second hopper $l$, which forms a part of the inclined chute L. The chute L may be placed at such an angle that the nails will by their own weight gravitate down the channel to the enlarged end thereof.

The chute L is preferably made in two pieces and shaped as shown in the drawings. On the inner sides of the piece are provided a facing $l'$, (of the shape shown at Fig. 7,) which are together of a greater thickness than the stem of the largest nail to be employed, but of a less width than the size of the head of the nail. By this means a channel is formed for guiding the nails to the enlarged end of the chute. In some cases the sides of the chute may also be grooved or recessed, as shown at Fig. 35. In order to allow the nails to get into the required vertical position for passing down the channel after they escape from the intermediate hopper J, the chute is made hopper-shaped for a portion of its length until it reaches the incline $l$. Below the latter the channel in the chute is protected by a suitable cover $l^3$, placed a little distance—say about a sixteenth of an inch—above the upper face of the chute.

In some cases it is necessary to turn the heads of "fitters" or other similar nails partially or wholly round as they gravitate down the covered portion of the chute for arranging them in proper position for insertion in the sole. For this purpose a pin or projection $l^2$ (shown at Fig. 35) may be formed on or fixed to one of the portions of the slide in any convenient distance between the hopper $l$ and enlarged end of chute $l^4$.

In some cases the incline $l^x$ may be dispensed with, and the chute may be in one continuous line from the hopper J to the enlarged end $l^4$, as shown at Fig. 2.

The nails after passing down the chute come in contact with the projection $l^5$, and are prevented from passing along the passage $l^6$, communicating with the hole $l^7$, by means of the arm $l^8$ of the curved and adjustable lever $l^9$, pivoted to a pin $l^{10}$, fixed in the recessed or cut-away portion of enlarged end $l^4$. The lever $l^9$ may be adjusted by means of the set-screw working in its arm $l^{11}$, and it may be kept up to its work by means of the spiral springs $l^{12}$. As soon as a nail reaches the projection $l^5$ of the enlarged end $l^4$, a portion of the nail-head covers the projection and end $l^8$ of lever $l^9$ and rests there until acted upon by a spring pin or piece $l^{18}$, working in a groove or slit $l^{14}$, while its free end is carried in bearing $l^{15}$, fixed to the chute, as shown at Figs. 8, 9, 10, and 11. To convey the nails one at a time to the hole $l^7$ motion is imparted from the slide M to the spring-piece $l^{13}$ through bell-crank lever $l^{16}$, pivoted to block $m$. When the spring-piece $l^{13}$ is pressed forward in the direction of the hole $l^7$, the stem of the nail is carried forward until it comes in contact with the arm $l^8$, (the head of the nail meanwhile slides upon the top of the projection $l^5$ and enlarged end $l^4$,) when by the continued forward motion of the spring-piece the arm $l^8$ is pushed back within, or nearly so, the hole $l^7$, and a free passage thereby provided for the nail to be delivered into the hole and from thence to the dies (through a suitable tube) to the setting-tool. When it is found necessary to again reverse or arrange the heads of the nails for dropping into the conducting-tube in the required position, a pin or projection $l^{17}$ may be provided in the passage at the entry of the hole $l^7$.

The slide M is carried in a block $m$, bolted to the standard. An intermittent reciprocating motion is imparted to the slide M from arm C on driving-shaft A' through runner $m'$, lever $m^2$, and shaft $m^3$, carried in bearing $a^3$. The lever is made in two portions $m^4$ $m^5$. A stud or projection $m^6$ is fixed to the opposite end of the slide to that at which the rod $i$ is connected for reciprocating or partially rotating the nail-box H whenever the slide M is operated. In order to be able to throw the slide M readily in and out of action, the upper portion $m^4$ of the lever, made in two parts, is keyed to shaft $m^3$, and is provided with a male portion of a V-slide. On this $V^D$ portion slides the lower part $m^5$ of the lever, and in its normal position its lower end is kept clear of the pin $m^6$ by a spiral spring $m^{11}$, fixed to a pin $m^7$, working in a slot $m^8$ at the back of the lever; but when it is required to bring the slide into action the lever portion $m^5$ is drawn downward by handle $m^9$ until the spring-pin $m^{10}$ passes into a hole or notch in the upper portion $m^4$ and holds it there until the operator withdraws the pin $m^{10}$, when spring $m^{11}$ immediately raises the end clear of the pin $m^6$. When more than one of these double-levers are keyed onto shaft $m^3$, they may be arranged one behind the other and of varying lengths, each double-lever having a certain amount of lost motion in order to permit of them being actuated by the same cam, and at the same time for the slides to have an equal amount of traverse. After the slide has been drawn toward the setting-tool for actuating the spring-piece $l^{13}$, through lever $l^{16}$, immediately the end $m^5$ of the lever commences to recede, the spring $m^{12}$ (which has been expanded by the operation described) commences to contract for returning the slide to the position shown in the drawings.

Each chute may be attached at one end to the block $m$, and at or near the hopper end thereof by a bracket $l^{20}$ to the standard A. In the drawings the slides and tubes and other parts are shown connected therewith suitable for receiving and conveying a round-headed nail to the dies and setting-tool; but when it is required to convey square or other headed nails the tubes and other parts will require to be shaped accordingly. The tubes communicating with the die-box may be also provided with inclines or their equivalents, for turning or twisting the nails wholly or partially round during their passage through the tubes.

In order to readily clear the mouth of the conducting-tube should it in any way become choked, the front outer portion of the enlarged end of each chute may be hinged to its side, as shown at $l^{18}$, Fig. 11, and retained in a closed position by means of a spring-catch $l^{19}$.

In order to supply nails which are usually known as "fitters," (that is, with a tapering head $l$,) mock clinkers or other nails on a plate $b^8$ may be mounted on a horizontal ring T, (made in two parts, bolted together,) provided with ratchet-teeth on its periphery, in which a pawl $t$ engages. The pawl $t$ is mounted on a bracket $t'$, pivoted to a bracket $t^2$, bolted to the standard A, and is capable of receiving a reciprocating motion from a cam E on the driving-shaft through lever $t^3$, pivoted at $t^4$ to bracket $t^5$, (bolted to standard A,) connecting-rod $t^6$, adjustably connected to L-lever $t^7$, which is also pivoted to bracket $t^2$. In the ring T are also cut any desired number of holes to suit the nail-heads. The nails are fed into the holes or recesses above mentioned by hand and as the ring revolves on its bearing-plate $t^8$, which may communicate with the die N by means of a tube $l^{21}$ in a similar manner to that already described. When more than one row of holes or recesses are provided in the ring, then a separate hole in the plate and communicating tube for each row will require to be provided, or the ring may be mounted upon an adjustable pivot or bearing; but, when preferred, the ring T may be dispensed with and a separate slide, which has previously been filled by hand with nails, may be hooked onto the chutes, previously described, and allowed to empty itself through a suitable aperture. The nails after passing through the hole $l^7$ enter a tube $l^{21}$, by which they are conducted through a hole $n$ in nail-guide block $n'$ to the dies N, bolted to the fixing or bracket $n^2$, which in turn is bolted to the slide-carrying block $m$. This guide is provided with a number of holes $n$, (corresponding in number with that of the tubes $l^{21}$ and the chutes L employed,) and in a recess in which is inverted the two dies N, which are held in position or face contact by means of the flat spring-pieces $n^5$ $n^5$. In each of the dies is a vertical semicircular tapering hole $n^4$, as shown at Figs. 26 and 27, the longer and larger portion of which is made at its lower end to taper into the smaller one.

The upper portion of the hole $n^4$ is of such a diameter that the heads of the nails can pass readily through it, while the smaller diameter is just large enough to receive the shank and hold it there until the fixing tool or ram descends to force open the dies and to drive in the nail. The fixing-tool P is carried by a nipple $p$ in the end of the piston-rod $p'$, a portion of which works within a cylinder $p^2$, which is fixed to a projecting barrel $p^3$ of the fender F. This barrel also forms the lower bearing for the piston-rod. On the piston-rod and within the cylinder is a piston $p^4$, between which and the upper inner portion of the cylinder is fixed a spiral spring $p^5$, as shown at Fig. 2.

In order to impart the required pressure to the setting-tool P, a screw $p^6$ is passed into the top of the cylinder $p^2$ and is locked in position by a nut $p^7$. The screw $p^6$ also forms a bearing for the upper part of the piston-rod. The stroke of the fixing-tool P is adjusted by means of the lock-nuts $p^8$, (shown at Fig. 2,) and to prevent any rebound of the rod when the fixing-tool has driven in the nail a recess is provided in the top of the screw $p^6$, which is filled with india-rubber or elastic packing $p^9$.

An intermittent reciprocating motion is imparted to the fixing-tool by means of a cam D, mounted on the end of shaft A'. The cam raises the tool to its highest point, thereby compressing the spring $p^5$, but as soon as this has been reached the spring causes the tool to descend with such force that in falling it passes through the dies and when it comes in contact with the taper parts of the hole it forces them open sidewise, and in its further progress drives the nail into the article being operated upon. It will be observed that while the fixing-tool is doing this the nail is guided and kept in a vertical position until the tool has reached its lowest point and completed its work. The fixing-tool I may be arranged so that its end when at the highest point will not pass out of the hole $n^3$ in the block $n'$, carrying the die-box.

The last (upon which the upper has been lasted) as it leaves the lasting-machine is mounted on a pillar Q, so that its toe may rest upon a second pillar Q'. These pillars are mounted in adjustable bearings upon a sliding framing $q'$, provided with the universal joint $q^2$, by which it is connected to the supporting-rod $q^3$. The rod is passed through the bearing formed in the end of bracket $a^4$ and connected with its lowest end to the weighted treadle R, pivoted to the standard A at R'. In order to adjust the last to any desired position, the upper portion $q^4$ of the pillar Q is pivoted to its lower portion $q^5$ and the two parts are kept in the desired position by means of a screw $q^6$, operated by a handle. It will be readily seen that by the combined action of the universal joint and sliding table the boot can be manipulated in any desired direction under the setting-tool.

In order to feed or traverse the boot-sole the required distance or pitch of the nails, a horizontal shaft $s$ is carried in suitable bearings in the bracket $n^2$. On this shaft is mounted, with one of its faces impinging against the dies N, a feed-wheel S, and on the opposite end is mounted a friction wheel and clutch arrangement $s'$ (of a somewhat similar arrangement to that described for the nail-boxes) and a double-ended lever $s^2$, one end of which is connected with the tappet-rod $s^3$, (which conveys the required intermittent motion to the feed-wheel whenever it is acted upon by the cam D,) while the opposite end $s^4$ is kept in facial contact with a sliding piece $s^7$ (carried in bracket $s^9$ and armed with an adjusting-screw and lock-nut $s^5$) by cam $s^×$. The sliding piece and cam are held in contact by spring $s^6$. Whenever the cam D depresses the rod $s^3$, the jaws of the friction-clutch arrangement are forced or wedged against the rim $s'$, and thus carries the feed-wheel round for feeding purposes. $s'$ is a set-screw for regulating the stroke of the lever $s^2$ and of the feed-wheel.

In order to regulate the distance of the nails from the edges of the soles, in the bracket or fixing $n^2$ is attached or formed a V-slide $u$, in which a plate $u^2$, armed with a runner $u'$, slides. The plate $u^2$ is provided with a recess $u^3$, through which an adjustable distance-gage or piece $u^4$ (the sides of which are inclined or taper in various directions, as shown at Fig. 32) is passed, and against which an adjusting-screw $u^5$ is kept in contact by an india-rubber or other spring $u^6$. The block $u^4$ is mounted upon a screw $u^7$ in such manner as to be capable of being turned axially thereon without altering its height; but when it is required to raise or lower the block to suit various sizes or kinds of nails the screw $u^7$ is passed into the boss $u^8$ (which acts as a nut) of the bracket $u^9$, carried on the V-slide $u^{10}$.

In order that nails having heads of various sizes may be easily and readily driven into the sole at varying distances from its edge, the block $u^4$ is provided with sides more or less at an angle, whereby provision is made for increasing or diminishing the distance of the runner $u'$ from the edge of the feed-wheel S, according to the shape and height of the face of the block that may be brought into contact with the head of the adjusting-screw $u^5$; but when it is required to put three rows in the center of a boot-sole (in a straight line or an arc) the bracket $u^9$ and parts connected therewith are thrown back by withdrawing the spring-pin $u^{11}$ from its retaining-hole by lever $u^{12}$ and pushing the bracket back on its slide $u^{10}$.

The required rotary motion for actuating the moving parts of the machine is imparted to the shaft A' in a similar manner to that described in the hereinbefore-mentioned specification—that is to say, on the shaft A' are mounted a pulley B (which is keyed thereon) and a loose and sliding friction clutch or pulley $b$, (provided with a slightly-coned end,) round which is placed a belt $b^9$. To the friction-clutch pulley $b$ is imparted a rotary motion from any convenient source through belt $b^9$, and when the coned end of the clutch-pulley $b$ is disengaged with the pulley B the said clutch-pulley $b$ is free to revolve on the shaft without actuating it or any of the moving parts of the machine. When it is desired to convey a rotary motion to the shaft A' for actuating the nail feeding, driving, and other moving parts of the machine, a sliding motion is imparted to the clutch-pulley $b$ (in the direction of arrow) from the weighted treadle $b^2$ (pivoted to standard at $b^×$) through connecting-rod $b^4$, lever $b^5$, and shaft $b^6$, which causes the coned end of the friction-clutch pulley $b$ to be brought into gear (frictional contact,) as shown in the drawings, with a recess formed for its reception in the fixed pulley B, thereby imparting motion to the shaft. At the same time that the treadle is depressed for operating the friction-clutch pulley $b$ the end of a bracket $b^7$, fixed to the lever $b^5$, is removed from a notch $b^8$, formed in the periphery of the flanged projection of the fast pulley B, which permits of the shaft A' revolving as soon as the coned end of the friction-clutch pulley $b$ comes in contact with the fast pulley B.

The action of the machine is as follows: The boot after being lasted is placed with its last on the jack Q and adjusted to the required height and position under the die-box. Ordinary nails having been placed in the boxes H (or ring T) are fed to the dies in the manner herein described. The runner $u'$ having been adjusted to the required distance, the machine is then set in motion by depressing the treadle $b^2$, which brings the friction-clutch $b$ (by means of rod $b^4$ and bell-crank lever $b^5$) into contact with pulley B when the cams C D E are caused to rotate for operating the boxes H, slides M, ring T, and for raising the driving-tool I to its highest position. When this point has been reached, it is permitted by the shape of the cam and the expansion of the spring to descend with sufficient force to open the dies N and drive the nail into the sole. During the rotation of the cam D its perimeter comes in contact with the upper end of tappet-rod $s^3$, which by means of friction-clutch $s'$, shaft $s$, and feed-wheel S traverses the work forward the required distance between the nails, which distance may be varied or adjusted by set-screws $s^{12}$. When the operator removes his foot from treadle $b^2$, the machine is speedily stopped by the arm $b^7$ passing into the groove or notch $b^8$ in the rim of the flange of pulley B.

The above-described improvements may be combined with or substituted for parts of the machine described in the hereinbefore-mentioned specification and adapted to rivet the sole to the uppers of boots or shoes.

What I claim as my invention, and desire to secure by Letters Patent, is—

1. The herein-described machine for feeding and driving loose nails into the soles of boots and shoes, comprising a standard, a horizontal shaft carrying at one end a friction-pulley and friction-clutch and at the other end three cams, a cylinder containing an adjustable spring and piston for actuating the setting-tool, the circular nail-receiving boxes on each side of the setting-tool over fixed inclined chutes, said boxes being intermittently rotated by friction mechanism, substantially as herein described, said chutes being armed with mechanism capable of delivering the nails in each chute separately into tubes communicating with a spring die-box, a ring-wheel, a feed-wheel and friction-clutch and tappet arrangement, and adjustable jack for supporting the work during the nailing operation, but allowing it to be raised, lowered, or moved in any required direction, substantitially as described.

2. In a machine for feeding and driving loose nails, the combination of a main frame, a main operating-shaft, a setting-tool, connections between the main shaft and the setting-tool, nail-boxes arranged in groups on opposite sides of the setting-tool, the die, chutes connecting the nail-boxes with the die, escape mechanism, substantially as described, for allowing one nail at a time to enter the die, actuating-connections between the nail-boxes and the main shaft, and devices for disconnecting the main shaft from any of the boxes, so that only one box shall be operated at a time to feed to the setting-tool.

3. In a machine for feeding and driving loose nails, the combination of a circular nail-receiving box H, having a number of apertures cast in its periphery, through which the nails escape, and a hinged lid $h^2$, with the friction mechanism, as described, gage $h'$, chute L, hopper J, and slide M, as and for the purposes specified.

4. In a machine for feeding and driving loose nails, the combination of a circular nail-receiving box H, having apertures in its periphery, and a hinged lid, said box being pivoted to arm G, friction mechanism $i^2$, gage $h'$, rod $i$, slide M, double lever $m^4$, and mechanism for actuating the same, as herein described, hopper J, inclined chute L, block $m$, double-ended cam-lever $l^{16}$, pin $l^{17}$, spring $m^{12}$, double-ended lever $l^9$, and spring $l^{12}$ for admitting one nail at a time to tube $l^{21}$, substantially as described.

5. In a machine for feeding and driving loose nails, the combination, with a fixed inclined chute armed at its upper end with a hopper, of an enlarged and hinged end $l^4$, pin $l^{13}$, spring $l^{12}$, projection $l^5$, double-ended lever $l^9$, and catch $l^{19}$, as and for the purposes specified.

6. In a machine for feeding and driving loose nails, the combination, with circular nail-receiving boxes H, hoppers J, fixed inclined chutes L, blocks $m$, and slides M, of levers $m^4$ and mechanism, as described, for operating same, each of said levers being formed in two portions and arranged for the outer and lower portions to slide upon the upper portions, as and for the purposes set forth.

7. In a machine for feeding and driving loose nails, the combination, with a setting-tool P and friction-driven feed-wheel S, of an adjusting-piece $u^4$, mounted on a screw $u^7$, working in bearings $u^8$ of a sliding bracket $u^9$, as and for the purposes set forth.

8. In a machine for feeding and driving loose nails, the combination of slide $u^{10}$, sliding bracket $u^9$, catch-lever $u^{12}$, and pin $u^{11}$, screw $u^7$, block $u^4$, slotted plate $u^2$, armed at one end with an adjusting-screw $u^5$ and at the other with runner $u'$, flexible spring $u^6$, slide $u$, bracket $n^2$, feed-wheel S, friction-actuating mechanism $s'$, tappet-rod $s^3$, cam D, lever $s^2$, sliding piece $s^7$, and cam-piece $s^×$, as and for the purposes specified.

9. In a machine for feeding and driving loose nails, the combination of feed-wheel S, friction-actuating mechanism S', substantially as described, bracket $n^2$, slotted arm $s^9$, slide $s^7$, lever $s^2$, sliding piece $s^7$, and cam-piece $s^×$, as and for the purposes specified.

10. In a machine for feeding and driving loose nails, the combination, substantially as set forth, of the main driving-shaft, the setting-tool connected therewith, the dies, the ring-wheel or nail-holder T, having a series of openings near its edge for the reception of nails and formed with ratchet-teeth on its periphery, a pawl engaging with the ratchet-teeth, and connections between the driving-shaft and the pawl.

11. In a machine for feeding and driving loose nails, the combination, substantially as set forth, of the main frame, the main driving-shaft, the setting-tool, the dies, the annular nail-holder T, having a series of openings near its edge for nails, connections between the main driving-shaft and the nail-holder T, and a chute leading from the nail-holder to the dies.

12. In a machine for feeding and driving loose nails, the combination of ring-wheel T, having vertical holes therein for receiving the nails and ratchet-teeth in its periphery supporting plate $t^8$, brackets $a^3$ $a^3$ $t^2$, standards A, driving-shaft A′, cam E, lever $t^3$, bracket $t^5$, connecting-rod $t^6$, levers $t'$ and $t^7$, pawl $t$, piston $t^x$, spring $t^{12}$, tube $t^{21}$, dies N, and setting-tool P.

13. In a machine for feeding and driving loose nails, the combination of standard A, setting-tool P, and mechanism, as described, for operating same, slide M, and nail feeding and supplying mechanism, as described, die-box $n'$, lever $s^2$, and means for operating same, feed-wheel, and friction mechanism, as described, for operating same, ring-wheel T, and mechanism, as described, for operating same, slide $u^{10}$, sliding bracket $u^9$, catch-lever $u^{12}$, and pin $u^{11}$, screw $u^7$, block $u^4$, slotted plate $u^2$, armed with runner $u'$, and adjusting-screw $u^5$, flexible spring $u^6$, slide $u$, bracket $n^2$, with the means for supporting and presenting the work to the action of the setting-tool, comprising the adjustable pillars Q Q′, slide $q$, block $q'$, ball-joint $q^2$, connecting-rod $q^3$, bearing $a^4$, weighted lever R, pivoted to the framing, and screw $q^6$, as and for the purposes set forth.

In testimony whereof I have hereunto signed my name to this specification in presence of two subscribing witnesses.

THOMAS BRINING.

Witnesses:
   GEORGE LISTER,
   W. FAIRBURN HART.